United States Patent
Wang et al.

(10) Patent No.: US 12,528,964 B2
(45) Date of Patent: Jan. 20, 2026

(54) AQUEOUS DISPERSION COMPRISING MULTISTAGE POLYMERIC PARTICLES

(71) Applicants: Rohm and Haas Company, Collegeville, PA (US); Dow Global Technologies LLC, Midland, MI (US)

(72) Inventors: Jinfei Wang, Shanghai (CN); Juan Zhao, Shanghai (CN); Xiaohong Yang, Shanghai (CN); Zhonghua Zhang, Shanghai (CN); Dong Yun, Shanghai (CN)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 819 days.

(21) Appl. No.: 17/430,330

(22) PCT Filed: Mar. 19, 2019

(86) PCT No.: PCT/CN2019/078662
§ 371 (c)(1),
(2) Date: Aug. 12, 2021

(87) PCT Pub. No.: WO2020/186447
PCT Pub. Date: Sep. 24, 2020

(65) Prior Publication Data
US 2022/0127489 A1    Apr. 28, 2022

(51) Int. Cl.
*C09D 133/10* (2006.01)
*C08F 20/06* (2006.01)
*C09D 7/20* (2018.01)

(52) U.S. Cl.
CPC .......... *C09D 133/10* (2013.01); *C08F 20/06* (2013.01); *C09D 7/20* (2018.01)

(58) Field of Classification Search
CPC ... C09D 143/02; C08L 33/08; C08L 2308/00; C08F 212/08; C08F 220/06; C08F 220/14; C08F 212/14; C08F 220/1806; C08F 220/1808; C08F 230/02; C08F 265/06
See application file for complete search history.

(56) References Cited

U.S. PATENT DOCUMENTS

| | | | |
|---|---|---|---|
| 2007/0128144 A1 | 6/2007 | Amela Conesa et al. | |
| 2014/0323753 A1* | 10/2014 | Ogasawara | C07F 9/09 558/186 |
| 2015/0166474 A1 | 6/2015 | Hotta et al. | |
| 2017/0145238 A1 | 5/2017 | Abelovski et al. | |
| 2018/0298223 A1 | 10/2018 | Li et al. | |

FOREIGN PATENT DOCUMENTS

| | | |
|---|---|---|
| CN | 1087413 | 6/1994 |
| CN | 101925615 | 12/2010 |
| CN | 102770123 | 11/2012 |
| CN | 103172786 | 6/2013 |
| CN | 108350124 | 7/2018 |
| EP | 1 323 787 * | 7/2003 |
| EP | 2008639 A2 | 12/2008 |
| JP | 04823508 B2 | 11/2011 |
| WO | 2009095569 | 8/2009 |
| WO | 2018119835 | 7/2018 |
| WO | 2019023845 | 2/2019 |

OTHER PUBLICATIONS

Meylan., "Atom/fragment contribution method for estimating octanol-water partition coefficients." J. Pharm. Sci., 1995, p. 83-92 vol. 84.

* cited by examiner

*Primary Examiner* — Robert T Butcher
(74) *Attorney, Agent, or Firm* — CANTOR COLBURN LLP

(57) ABSTRACT

An aqueous dispersion comprising (i) multistage polymeric particles comprising structural units of a specific polymerizable surfactant and (ii) from zero to 5%, by weight based on the weight of the multistage polymeric particles, of a metal salt; and a coating composition comprising such aqueous dispersion and providing coating films with good tannin blocking, early block resistance and sandability properties.

18 Claims, No Drawings

AQUEOUS DISPERSION COMPRISING MULTISTAGE POLYMERIC PARTICLES

FIELD OF THE INVENTION

The present invention relates to an aqueous dispersion comprising multistage polymeric particles and a process of making the same.

INTRODUCTION

Aqueous or waterborne coating compositions are widely used in industrial and architectural applications. However, waterborne coatings have found limited acceptance in wood finishing. Water-soluble chromophoric compounds, such as tannin, on and in the wood surface bleed through the applied waterborne coatings to stain, discolor and detract from the resulting finish quality, particularly for coatings on tannin rich wood substrates such as Merbau or Cedar (red pine). The color change impacts furniture appearance, especially when the furniture is coated with white paints.

Attempts have been made to improve tannin blocking of pigmented coating systems comprising a primer and a topcoat. Primers comprising aqueous cationic dispersions of polymers with aminium ion functional groups on polymer backbone can interact with tannin, thus blocking migration of tannin from substrates through topcoats. However, these cationic aqueous dispersions have stability issues especially when used in pigmented coating formulations. In addition, coating films formed from these primers usually have unsatisfactory water resistance and are not compatible with topcoats which often use anionic polymers, leading to adhesion loss. After application of primers, coated panels need to be further sanded or stacked together for next coat. Thus, satisfactory sandability and early block resistance are also desirable properties.

Therefore, it is desirable to provide an aqueous dispersion, particularly suitable for wood coatings, capable of providing excellent tannin blocking and satisfactory early block resistance and sandability.

SUMMARY OF THE INVENTION

The present invention provides a novel aqueous dispersion of multistage polymeric particles and a coating composition comprising the aqueous dispersion. The coating composition of the present invention provides coating films with excellent tannin blocking as indicated by final b≤2.5 and delta b≤0.55 (after heatage at 50° C. for 48 hours and at 80° C. for 48 hours); an early block resistance level of D-0 or better; and a sandability level of 3 or higher. These properties are measured according to the test methods described in the Examples section below.

In a first aspect, the present invention is an aqueous dispersion comprising:
(i) multistage polymeric particles having a Tg in the range of from 0 to 80° C. and comprising a polymer A and a polymer B at a weight ratio of the polymer A to polymer B in the range of from 78:22 to 22:78, wherein Tg difference between the polymer A and the polymer B is 40° C. or more, and wherein the multistage polymeric particles comprise, by weight based on the weight of the multistage polymeric particles,
from 10% to 40% of structural units of a cycloalkyl(meth)acrylate,
from 40% to 85% of structural units of a hydrophobic monomer,
from 0.5% to 10% of structural units of an ethylenically unsaturated monomer carrying
at least one functional group selected from a carboxyl, carboxylic anhydride, sulfonic acid, amide, sulfonate, phosphoric acid, phosphonate, phosphate, or hydroxyl group, or a salt thereof,
structural units of a polymerizable surfactant having the structure of formula (I),

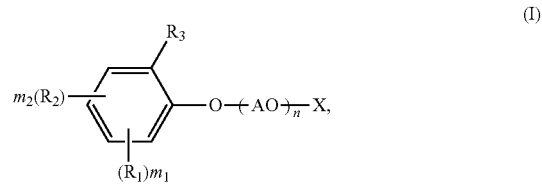

wherein $R_1$ is a phenyl group or a phenyl substituted alkyl group; m1 is 1, 2, 3 or 4, $R_2$ is an alkyl group or a substituted alkyl group; m2 is 0 or 1; $R_3$ is a hydrogen atom; an alkyl group, preferably having from 1 to 20 carbon atoms; or $-C(R_4)=CR_5R_6$, wherein $R_4$, $R_5$ and $R_6$ are each independently hydrogen or an alkyl group having 1 to 22 carbon atoms; A represents an alkylene group or a substituted alkylene group, having 2 to 4 carbon atoms; n is an integer of from 1 to 100; and X represents hydrogen or an anionic hydrophilic group selected from $-(CH_2)_a-SO_3M$, $-(CH_2)_b-COOM$, $-PO_3M_2$, $-P(Z)O_2M$, or $-CO-CH_2-CH(SO_3M)-COOM$, wherein a and b are each independently an integer of from 0 to 4, Z represents a residual obtained by removing X from the general formula (I), and each M represents hydrogen, an alkali metal cation, an alkaline earth metal cation, $NH_4+$, an aminium ion having an ethylenically unsaturated bond, an imidazolium ion having an ethylenically unsaturated bond, a pyridinium ion having an ethylenically unsaturated bond, a pyrrolidinium ion having an ethylenically unsaturated bond, or a piperidinium ion having an ethylenically unsaturated bond; provided that only one of $R_3$ and X contains an ethylenically unsaturated bond; and optionally
structural units of an additional ethylenically nonionic monomer; and
(ii) from 0 to 5%, by weight based on the weight of the multistage polymeric particles, of a metal salt.

In a second aspect, the present invention is a process of preparing the aqueous dispersion of the first aspect. The process comprises: preparing multistage polymeric particles by multistage free-radical polymerization at least one stage of polymerization forming a polymer A and at least one stage of polymerization forming a polymer B, and optionally, admixing the obtained multistage polymeric particles with from zero to 5%, by weight based on the weight of the multistage polymeric particles, of a metal salt.

In a third aspect, the present invention is an aqueous coating composition comprising the aqueous dispersion of the first aspect.

DETAILED DESCRIPTION OF THE INVENTION

"Aqueous" dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

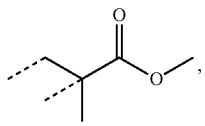

where the dotted lines represent the points of attachment of the structural unit to the polymer backbone.

By "multistage polymeric particles" herein is meant polymeric particles prepared by the sequential addition of two or more different monomer compositions. By "polymer" and "polymer B" herein are meant the polymer A and the polymer B having different compositions regardless of the order in which they were prepared in a multistage emulsion polymerization process.

The aqueous dispersion of the present invention comprises multistage polymeric particles. The multistage polymeric particles useful in the present invention may comprise a polymer A and a polymer B. The polymer A and the polymer B are different from each other and formed in different stages of multistage free-radical polymerization in preparing the multistage polymeric particles.

The polymer A and/or the polymer B in the multistage polymeric particles may comprise structural units of one or more polymerizable surfactants. The polymerizable surfactants may have the structure of formula (I),

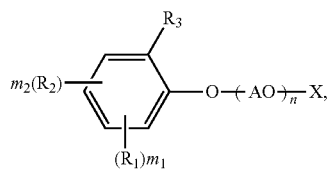

wherein $R_1$ is a phenyl group or a phenyl substituted alkyl group;

m1 is 1, 2, 3 or 4, preferably from 1 to 3;

$R_2$ is an alkyl group or a substituted alkyl group, preferably a $C_1$-$C_4$ alkyl or a substituted $C_1$-$C_4$ alkyl group;

m2 is 0 or 1, preferably 0;

$R_3$ is hydrogen; an alkyl group, preferably having from 1 to 20 carbon atoms or from 1 to 12 carbon atoms; or —C($R_4$)=$CR_5R_6$, wherein $R_4$, $R_5$ and $R_6$ are each independently hydrogen or an alkyl group having 1 to 22 carbon atoms or from 1 to 12 carbon atoms, such as methyl;

A represents an alkylene group or a substituted alkylene group, having 2 to 4 carbon atoms, such as ethylene, propylene, and butylene; preferably, an ethylene group;

n represents an average addition mole number of alkylene oxide and can be an integer of 1 or higher, 2 or higher, 3 or higher, 4 or higher, or even 5 or higher, and at the same time, 100 or lower, 60 or lower, 50 or lower, 40 or lower, or even 20 or lower; preferably, from 5 to 20; and X represents hydrogen or an anionic hydrophilic group selected from —(CH$_2$)$_a$—SO$_3$M, —(CH$_2$)$_b$—COOM, —PO$_3$M$_2$, —P(Z)O$_2$M, or —CO—CH$_2$—CH(SO$_3$M)-COOM, wherein a and b are each independently an integer of from 0 to 4, Z represents a residual obtained by removing X from the general formula (I), and each M independently represents hydrogen, an alkali metal cation, an alkaline earth metal cation, NH$_4^+$, an aminium ion having an ethylenically unsaturated bond, an imidazolium ion having an ethylenically unsaturated bond, a pyridinium ion having an ethylenically unsaturated bond, a pyrrolidinium ion having an ethylenically unsaturated bond, or a piperidinium ion having an ethylenically unsaturated bond, preferably, X represents —SO$_3$M; provided that only one of $R_3$ and X contains an ethylenically unsaturated bond.

In formula (I), each $R_1$ may be the same or different and can be a phenyl substituted alkyl group such as

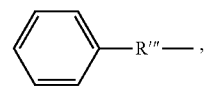

wherein R''' is an alkylene group having from 1 to 4 carbon atoms, preferably having from 2 to 3 carbon atoms, such as for example, —CH$_2$—, —CH(CH$_3$)—, or —C(CH$_3$)$_2$—. More preferably, $R_1$ is

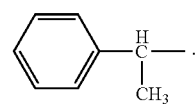

In formula (I), preferred m1 is from 1 to 3. More preferably, m1 is 3.

In formula (I), preferred n is an integer ranging from 2 to 20, more preferably from 5 to 20.

In formula (I), preferred A is an ethylene group (—CH$_2$CH$_2$—). More preferably, A is —CH$_2$CH$_2$— and n is an integer ranging from 2 to 20.

In some embodiments, the polymerizable surfactant has the structure of formula (I), wherein m1 is 1, 2 or 3, n is an integer ranging from 2 to 20, A is an ethylene group, and $R_1$ is

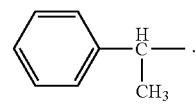

In some embodiments, in formula (I), $R_3$ is —C($R_4$)=CR$_5$R$_6$ and M independently represents hydrogen, an alkali metal cation, an alkaline earth metal cation, or NH$_4^+$. Preferably, the polymerizable surfactant has the structure of formula (I), wherein $R_3$ is —CH═CH(CH$_3$), and X is —SO$_3$M, wherein M is an alkali metal cation such as Li$^+$, Na$^+$, or K$^+$, an alkaline earth metal cation, or NH$_4^+$. More preferably, m1 is from 1 to 3 and $R_1$ is

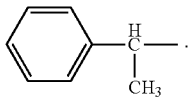

Most preferably, m2 is zero and A —CH$_2$CH$_2$—. Specific examples of the polymerizable surfactants may include the following structure:

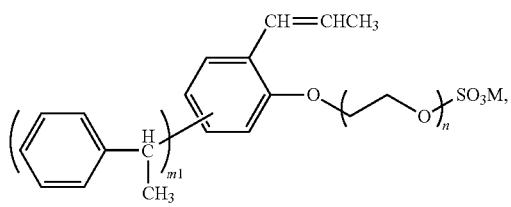

wherein m1 and n are as defined above in formula (I), and M is Li$^+$, Na$^+$, K$^+$, or NH$_4^+$.

In some other embodiments, in formula (I), $R_3$ is hydrogen or an alkyl group, and M is an aminium ion having one ethylenically unsaturated bond. Preferably, the polymerizable surfactant has the structure of formula (I), wherein $R_3$ is hydrogen, and X is —SO$_3$M, wherein M is

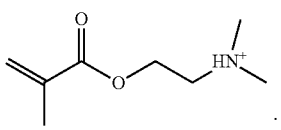

More preferably, m1 is from 1 to 3 and $R_1$ is

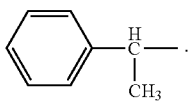

Most preferably, m2 is zero and A is —CH$_2$CH$_2$—. Specific examples of the polymerizable surfactants may include the following structure:

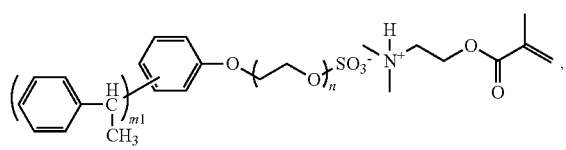

wherein m1 and n are as defined above in formula (I).

The multistage polymeric particles useful in the present invention may comprise, by weight based on the weight of the multistage polymeric particles, structural units of the polymerizable surfactant in an amount of 0.1% or more, 0.5% or more, 0.8% or more, 1% or more, 1.2% or more, 1.5% or more, 1.8% or more, or even 2% or more, and at the same time, 3% or less, 2.8% or less, 2.5% or less, or even 2.2% or less. "Weight of the multistage polymeric particles" in the present invention refers to the dry or solids weight of the multistage polymeric particles.

The polymer A and/or the polymer B in the multistage polymeric particles may further comprise structural units of one or more cycloalkyl(meth)acrylates. Examples of suitable cycloalkyl(meth)acrylates include cyclohexyl (meth) acrylate, methcyclohexyl (meth)acrylate, dihydrodicyclopentadienyl(meth)acrylate, trimethylcyclohexyl (meth) acrylate, t-butyl(meth)cyclohexyl acrylate, or mixtures thereof. Preferred cycloalkyl(meth)acrylates include cyclohexyl methacrylate, cyclohexyl acrylate, methcyclohexyl acrylate, or mixtures thereof. Preferably, the polymer A comprises structural units of the cycloalkyl(meth)acrylate. The multistage polymeric particles may comprise, by weight based on the weight of the multistage polymeric particles, structural units of the cycloalkyl(meth)acrylate in a combined amount of 10% or more, 11% or more, 12% or more, 13% or more, 14% or more, or even 15% or more, and at the same time, 40% or less, 39% or less, 38% or less, 36% or less, 35% or less, 32% or less, 31% or less, 30% or less, 28% or less, 25% or less, 22% or less, 20% or less, or even 18% or less.

The polymer A and/or the polymer B in the multistage polymeric particles may also comprise structural units of one or more hydrophobic monomers. "Hydrophobic monomers" refer to monomers having a calculated Hansch parameter >2.0. As used herein, the term "calculated Hansch parameter" for any molecule refers to parameters representing an index of polymer hydrophobicity, with higher values indicating greater hydrophobicity, as calculated according to the Kowwin methodology. A tool for this can be downloaded at http://www.epa.gov/oppt/exposure/pubs/episuitedl.htm. The Kowwin methodology uses a corrected "fragment constant" methodology to predict the Hansch parameter, expressed as log P (Equation 1). For any molecule, the molecular structure is divided into fragments each having a coefficient and all coefficient values in the structure are summed together to yield the log P estimate for the molecule. Fragments can be atoms but are larger functional groups (e.g. C═O) if the groups give a reproducible coefficient. The coefficients for each individual fragment were derived by multiple regression of reliably measured log P values (KOWWIN's "reductionist" fragment constant methodology), wherein the log P is measured by testing the fragment in a mixture of water and a given hydrophobic organic solvent. In the corrected fragment constant methodology, the coefficients of groups are adjusted by a correction factor to account for any differences between a measured log P coefficient value of a group and a log P for the same group that would result from summing the estimated log P coefficients from all atoms in the group alone. The KOWWIN calculation tool and estimation methodology were developed at Syracuse Research Corporation. A journal article by Meylan and Howard (1995) describes the program methodology as the "Atom/fragment contribution method for estimating octanol-water partition coefficients." J. Pharm. Sci. 1995, 84, 83-92. Hansch parameters can be calculated from coefficient values found at the website listed. Hansch parameters for common vinyl monomers are available from "Exploring QSAR: Volume 2: Hydrophobic, Electronic and Steric Constants", Hansch, C., Leo, A., Hoekman, D., 1995, American Chemical Society, Washington, D.C. The equation 1 is given as follows, $$\log P = \Sigma(f_i n_i) + \Sigma(c_j n_j) + 0.229 \quad \text{(Equation 1)},$$

where $\Sigma(f_i n_i)$ is the summation of $f_i$ (the coefficient for each atom/fragment) times $n_i$ (the number of times the atom/fragment occurs in the structure); and where $\Sigma(c_j n_j)$ is the summation of $c_j$ (the coefficient for each correction factor) times $n_j$ (the number of times the correction factor occurs (or is applied) in the molecule.

Suitable hydrophobic monomers may include, for example, vinyl aromatic monomers, $C_4$-$C_{20}$-alkyl (meth)acrylates, or mixtures thereof. The $C_4$-$C_{20}$-alkyl (meth)acrylates refer to alkyl esters of (meth)acrylic acid containing an alkyl with from 4 to 20 carbon atoms, or from 4 to 18 carbon atoms. The hydrophobic monomers preferably include one or more vinyl aromatic monomers in combination with one or more $C_4$-$C_{20}$-alkyl (meth)acrylates. Specific examples of suitable hydrophobic monomers include styrene, substituted styrene such as alpha-methylstyrene, trans-beta-methylstyrene, 2,4-dimethylstyrene, ethylstyrene, butylstryene, and p-methoxystyrene; o-, m-, and p-methoxystyrene; and p-trifluoromethylstyrene; butyl (meth)acrylate, iso-butyl (meth)acrylate, 2-ethylhexyl (meth)acrylate, lauryl (meth)acrylate, stearyl (meth)acrylate, or mixtures thereof. Preferred hydrophobic monomers include styrene, 2-ethylhexyl acrylate, butyl acrylate, butyl methacrylate, or mixtures thereof. Preferably, the polymer B comprises structural units of the hydrophobic monomer, more preferably, in an amount of 45% or more, 50% or more, 55% or more, 60% or more, 65% or more, or even 70% or more, at the same time, 100% or less, 98% or less, 95% or less, or even 90% or less, by weight based on the weight of the polymer B. The multistage polymeric particles may comprise, by weight based on the weight of the multistage polymeric particles, structural units of the hydrophobic monomer in a combined amount of 40% or more, 45% or more, 50% or more, 55% or more, 60% or more, or even 65% or more, and at the same time, 85% or less, 80% or less, 75% or less, or even 70% or less. Preferably, the multistage polymeric particles comprise, by weight based on the weight of the multistage polymeric particles, from 10% to 50% of the vinyl aromatic monomer such as styrene and from 20% to 40% of the $C_4$-$C_{18}$-alkyl (meth)acrylate such as 2-ethylhexyl acrylate, butyl acrylate, or mixtures thereof.

The polymer A and/or the polymer B in the multistage polymeric particles may comprise structural units of one or more ethylenically unsaturated monomer carrying at least one functional group selected from a carboxyl, carboxylic anhydride, sulfonic acid, amide, sulfonate, phosphoric acid, phosphonate, phosphate, or hydroxyl group; a salt thereof; or combinations thereof (hereinafter "ethylenically unsaturated functional monomers"). Examples of suitable ethylenically unsaturated functional monomers include α, β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group such as anhydride, (meth)acrylic anhydride, or maleic anhydride; sodium styrene sulfonate (SSS), sodium vinyl sulfonate (SVS), 2-acrylamido-2-methylpropanesulfonic acid (AMPS), sodium salt of 2-acrylamido-2-methyl-1-propanesulfonic acid, ammonium salt of 2-acrylamido-2-methyl-1-propane sulfonic acid; sodium salt of allyl ether sulfonate; acrylamide, methacrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide; hydroxy-functional (meth)acrylic acid alkyl ester such as hydroxyethyl methacrylate and hydroxypropyl methacrylate; phosphoalkyl (meth)acrylates such as phosphoethyl(meth)acrylate, phosphopropyl (meth)acrylate, phosphobutyl(meth)acrylate, salts thereof, and mixtures thereof; $CH_2=C(R_{p1})-C(O)-O-(R_{p2}O)_p-P(O)(OH)_2$, wherein $R_{p1}=H$ or $CH_3$, $R_{p2}=$alkyl and p=1-10, such as SIPOMER PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, allyl ether phosphate, vinyl phosphonic acid, salts thereof, or mixtures thereof. Preferred ethylenically unsaturated functional monomers are phosphoethyl methacrylate (PEM), acrylic acid (AA), methacrylic acid (MAA), or mixtures thereof.

The multistage polymeric particles may comprise, by weight based on the weight of the multistage polymeric particles, 0.5% or more, 0.6% or more, 0.7% or more, 0.8% or more, 0.9% or more, 1.0% or more, 1.1% or more, or even 1.2% or more, and at the same time, 10% or less, 8% or less, 6% or less, 5% or less, 4.5% or less, 4% or less, 3.5% or less, 3% or less, 2.5% or less, 2% or less, or even 1.5% or less of structural units of the ethylenically unsaturated functional monomers.

The polymer A and/or the polymer B in the multistage polymeric particles may comprise structural units of one or more additional ethylenically unsaturated nonionic monomers that are different from the monomers described above. The additional ethylenically unsaturated nonionic monomers may include $C_1$-$C_3$-alkyl (meth)acrylate such as methyl acrylate, methyl methacrylate, ethyl acrylate, and ethyl methacrylate; alkylvinyldialkoxysilanes; vinyltrialkoxysilanes such as vinyltriethoxysilane and vinyltrimethoxysilane; (meth)acryl functional silanes including, for example, (meth)acryloxyalkyltrialkoxysilanes such as gamma-methacryloxypropyltrimethoxysilane and methacryloxypropyltriethoxysilane; 3-methacryloxypropylmethyldimethoxysilane; 3-methacryloxypropyltrimethoxysilane; 3-methacryloxypropyltriethoxysilane; or mixtures thereof. The multistage polymeric particles may comprise, by weight based on the weight of the multistage polymeric particles, from 0 to 25%, from 0.1% to 20%, from 0.5% to 15%, of structural units of the additional ethylenically unsaturated nonionic monomers.

The polymer A and/or the polymer B in the multistage polymeric particles may optionally comprise structural units of one or more multiethylenically unsaturated monomers including di-, tri-, tetra-, or higher multifunctional ethylenically unsaturated monomers. Suitable multiethylenically unsaturated monomers may include, for example, butadiene, allyl(meth)acrylate, divinyl benzene, ethylene glycol dimethacrylate, butylene glycol dimethacrylate, or mixtures thereof. The multistage polymeric particles may comprise, by weight based on the weight of the multistage polymeric particles, from 0 to 3.0%, from 0.05% to 0.8%, or from 0.1% to 0.5%, of structural units of the multiethylenically unsaturated monomer.

Preferred polymer A in the multistage polymeric particles comprises: (a1) structural units of the cycloalkyl(meth)acrylate, (a2) structural units of the ethylenically unsaturated functional monomer, (a3) structural units of the hydrophobic monomer, the additional ethylenically unsaturated nonionic monomer, or mixtures thereof, and optionally, (a4) structural units of the polymerizable surfactant. Preferred polymer B in the multistage polymeric particles comprises: (b1) structural units of the hydrophobic monomer, and optionally, (b2)

structural units of the cycloalkyl(meth)acrylate, the ethylenically unsaturated functional monomer, the polymerizable surfactant, the additional ethylenically unsaturated nonionic monomer, or mixtures thereof. The polymer A in the multistage polymeric particles may comprise, by weight based on the weight of the polymer A, (a1) structural units of the polymerizable surfactant in an amount of from 0.1% to 3%, from 0.5% to 2.5%, or from 1% to 2%;

(a2) structural units of the cycloalkyl(meth)acrylate in an amount of from 30% to 60%, from 35% to 55%, or from 40% to 50%;

(a3) structural units of the ethylenically unsaturated functional monomer in amount of from 0.5% to 15%, from 1% to 12%, or from 1.5% to 10%; and (a4) structural units of the hydrophobic monomer, the additional ethylenically unsaturated nonionic monomer, or mixtures thereof; and the polymer B in the multistage polymeric particles may comprises, by weight based on the weight of the polymer B, (b1) from 45% to 100%, from 50% to 100%, or from 55% to 100% of structural units of the hydrophobic monomer, and optionally, (b2) structural units of the cycloalkyl(meth)acrylate.

The polymer A and the polymer B in the multistage polymeric particles may be present at a weight ratio in the range of from 78:22 to 22:78, from 77.5:22.5 to 22.5:77.5, from 77:23 to 23:77, from 76.5:23.5 to 23.5:76.5, from 76:24 to 24:76, from 75.5:24.5 to 24.5:75.5, from 75:25 to 25:75, from 74.5:25.5 to 25.5:74.5, from 74:26 to 26:74, from 73.5:26.5 to 26.5:73.5, from 73:27 to 27:73, from 72.5:27.5 to 27.5:72.5, from 72:28 to 28:72, from 71.5:28.5 to 28.5:71.5, from 71:29 to 29:71, from 70.5:29.5 to 29.5:70.5, from 70:30 to 30:70, from 67.5:32.5 to 32.5:67.5, from 65:35 to 35:65, from 62.5:37.5 to 37.5:62.5, from 60:40 to 40:60, from 57.5:42.5 to 42.5:57.5, from 55:45 to 45:55, from 52.5:47.5 to 47.5:52.5, or from 50:50 to 47.5:52.5.

In some embodiments, the multistage polymeric particles comprise, by weight based on the weight of the multistage polymeric particles, from 10% to 30% of structural units of the cycloalkyl(meth)acrylate, from 1% to 2% of structural units of the polymerizable surfactant, from 45% to 80% of structural units of the hydrophobic monomer, from 0.5% to 5% of structural units of the ethylenically unsaturated functional monomer, and from 0 to 25% of structural units of the additional ethylenically unsaturated nonionic monomer.

Total concentration of the structural units of monomers described above in the multistage polymeric particles is equal to 100%. The types and levels of the monomers described above may be chosen to provide the multistage polymeric particles with a glass transition temperature (Tg) suitable for different applications. The multistage polymeric particles may have a Tg in the range of from zero to 80° C., from 20 to 70° C., from 30 to 65° C. The polymer A and/or the polymer B in the multistage polymeric particles may have a Tg difference of 40° C. or more, 45° C. or more, 50° C. or more, 55° C. or more, 60° C. or more, 65° C. or more, 70° C. or more, or even 75° C. or more. The Tg values of the polymer A and the polymer B herein can be measured by various techniques including, for example, differential scanning calorimetry (DSC) as described in the Examples section below. The particular values of Tg of the multistage polymeric particles reported herein are those calculated by using the following equation, $$Tg(P_M) = w(P_A)*Tg(P_A) + w(P_B)*Tg(P_B)$$

wherein $Tg(P_M)$ is the glass transition temperature of multistage polymeric particles, $w(P_A)$ is the weight fraction of polymer A in the multistage polymeric particles, $w(P_B)$ is the weight fraction of polymer B in the multistage polymeric particles, $Tg(P_A)$ is the glass transition temperature of polymer A, and $Tg(P_B)$ is the glass transition temperature of polymer B, all temperatures being in K. The glass transition temperatures of the polymer A and the polymer B are those measured by DSC.

Without being bounded by a theory, the multistage polymeric particles may comprise multiple different phases formed by the polymer A and the polymer B, and the multistage polymeric particles may have core-shell structure.

The multistage polymeric particles useful in the present invention may have an average particle size of from 50 nanometers (nm) to 500 nm, from 80 nm to 400 nm, or from 90 nm to 300 nm. The particle size herein refers to Z-average size and may be measured by a Brookhaven BI-90 Plus Particle Size Analyzer.

The aqueous dispersion of multistage polymeric particles of the present invention may further comprise one or more metal salts. Suitable metal salts may be selected from the group consisting of a zinc salt, a zirconium salt, an aluminum salt, or mixtures thereof. The aqueous dispersion may comprise, by weight based on the weight of the multistage polymeric particles. from 0 to 5% of the metal salt, for example, 0.1% or more, 0.2% or more, 0.3% or more, 0.4% or more, 0.5% or more, 0.6% or more, 0.8% or more, 1.0% or more, 1.1% or more, 1.2% or more, 1.4% or more, 1.5% or more, 1.6% or more, 1.8% or more, or even 2.0% or more, and at the same time, 5% or less, 4.8% or less, 4.5% or less, 4.2% or less, 4% or less, 3.8% or less, 3.5% or less, 3.4% or less, 3.2% or less, 3.1% or less, or even 3.0% or less.

The aqueous dispersion of multistage polymeric particles of the present invention may further comprise water. The concentration of water may be, by weight based on the total weight of the aqueous dispersion, from 30% to 90% or from 40% to 80%. The aqueous dispersion of the present invention may be useful in many applications including, for example, wood coatings, metal protective coatings, architecture coatings, and traffic paints.

The process of preparing the aqueous dispersion of multistage polymeric particles may include multistage free radical polymerization, preferably emulsion polymerization, in which at least two stages are formed sequentially, which usually results in the formation of multistage polymeric particles comprising the polymer A and the polymer B, optionally the different stages can be formed in different reactors. Each of the stages is sequentially polymerized and different from the immediately proceeding and/or immediately subsequent stage by a difference in monomer composition. The multistage free-radical polymerization may include at least one stage forming the polymer A and at least one stage forming the polymer B, for example, forming the polymer A in the first stage, followed by forming the polymer B in the second stage in the presence of the polymer A formed in the first stage. Alternatively, the process may include forming the polymer B in the first stage, followed by forming the polymer A in the second stage in the presence of the previously formed polymer B. Each stage of the free-radical polymerization can be conducted by polymerization techniques well known in the art. Total concentration of monomers for preparing the multistage polymeric particles is equal to 100%. A mixture of the monomers for preparing the polymer A and/or the polymer B may be added neat or as an emulsion in water; or added in one or more additions or continuously, linearly or nonlinearly, over the reaction period of preparing the polymer A and/or the polymer B, respectively, or combinations thereof. Temperature suitable for emulsion polymerization processes may be lower than 100° C., in the range of from 30 to 95° C., or in the range of from 50 to 90° C.

In the multistage free radical polymerization process, free radical initiators may be used in each stage. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers used for preparing the multistage polymeric particles. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Chelating agents for the metals may optionally be used.

In the multistage free radical polymerization process, a surfactant may be used in each stage. The polymerizable surfactant described above may be added prior to or during the polymerization of the monomers, or combinations thereof. A portion of the polymerizable surfactant can also be added after the polymerization. Surfactants may be used for at least one stage or all stages of preparing the multistage polymeric particles. One or more additional surfactants may be added. Examples of suitable additional surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. The additional surfactants may be used in an amount of from 0 to 3%, from 0.3% to 2%, or from 0.5% to 1.5%, by weight based on the weight of total monomers used for preparing the multistage polymeric particles.

In the multistage free-radical polymerization process, a chain transfer agent may be used in each stage of polymerization. Examples of suitable chain transfer agents include 3-mercaptopropionic acid, methyl mercaptopropionate, butyl mercaptopropionate, n-dodecyl mercaptan, benzenethiol, azelaic alkyl mercaptan, or mixtures thereof. The chain transfer agent may be used in an effective amount to control the molecular weight of the resultant polymer A and/or the polymer B. The chain transfer agent may be present in an amount of from 0 to 3%, from 0.1% to 2%, from 0.2% to 1%, or from 0.3% to 0.5%, by weight based on the weight of the multistage polymeric particles.

The pH value of the obtained aqueous dispersion of multistage polymeric particles may be controlled to be at least 7, for example, by neutralization. Neutralization may be conducted by adding one or more bases which may lead to partial or complete neutralization of the ionic or latently ionic groups of the multistage polymeric particles. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1, 12-diamine, polyethyleneimine or polyvinylamine; aluminum hydroxide; or mixtures thereof. The metal salt described above may be added into the aqueous dispersion prior to neutralization, after neutralization, or combinations thereof.

The present invention also relates to an aqueous coating composition comprising the aqueous dispersion of multistage polymeric particles described above or the aqueous dispersion of multistage polymeric particles obtained from the process described above. The aqueous dispersion of multistage polymeric particles may be present, by solids weight based on the total solid weight of the aqueous coating composition, in an amount of from 10% to 60%, from 13% to 55%, or from 15% to 52%.

The aqueous coating composition of the present invention may also comprise one or more pigments. As used herein, the term "pigment" refers to a particulate inorganic material which is capable of materially contributing to the opacity or hiding capability of a coating. Such materials typically have a refractive index greater than 1.8. Examples of suitable pigments include titanium dioxide ($TiO_2$), zinc oxide, zinc sulfide, iron oxide, barium sulfate, barium carbonate, or mixtures thereof. The aqueous coating composition may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 0 to 50%, from 10% to 45%, or from 15% to 40%. PVC of a coating composition may be determined according to the equation: PVC %=[Volume$_{(Pigment+Extender)}$/Volume$_{Pigment+Extender+Binder}$]×100%.

The aqueous coating composition of the present invention may also comprise one or more matting agents. "Matting agents" herein refer to any inorganic or organic particles that provide matt effect. Matting agents usually have an average particle size of 5.5 microns or more according to the ASTM E2651-10 method. The matting agents may be selected from silica matting agents, polyurea matting agents, polyacrylate, polyethylene, polytetrafluoroethene, or mixtures thereof. The matting agent may be present, by solids weight based on the total weight of the aqueous coating composition, in an amount of from 0 to 5%, from 0.1% to 4%, or from 1% to 3%.

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. The defoamer may be present, by weight based on the total weight of the aqueous coating composition, generally from 0 to 2%, from 0.01% to 1.5%, or from 0.1% to 1%.

The aqueous coating composition of the present invention may further comprise one or more thickeners (also known as "rheology modifiers"). The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferred thickener is based on HEUR. The thickener may be present, by weight based on the total weight of the aqueous coating composition, from 0 to 5%, from 0.01% to 4%, or from 0.05% to 3%.

The aqueous coating composition of the present invention may further comprise one or more wetting agents. "Wetting agents" herein refer to chemical additives that reduce the surface tension of a coating composition, causing the aqueous coating composition to more easily spread across or penetrate the surface of a substrate. Wetting agents may be polycarboxylates, anionic, zwitterionic, or non-ionic. The wetting agent may be present, by weight based on the total weight of the aqueous coating composition, in an amount of from 0 to 5%, from 0.01% to 4%, or from 0.1% to 3%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present, by weight based on the total weight of the aqueous coating composition, in an amount of from 0 to 12%, from 0.1% to 10%, or from 1% to 9%.

The aqueous coating composition of the present invention may further comprise water, for example, in an amount of from 30% to 90%, from 40% to 85%, or from 50% to 80%, by weight based on the total weight of the aqueous coating composition.

In addition to the components described above, the aqueous coating composition of the present invention may further comprise any one or combination of the following additives: buffers, neutralizers, dispersants, humectants, biocides, anti-skinning agents, colorants, flowing agents, antioxidants, plasticizers, freeze/thaw additives, leveling agents, thixotropic agents, adhesion promoters, anti-scratch additives, and grind vehicles. These additives may be present in a combined amount of, from 0 to 5%, from 0.001% to 3%, or from 0.01% to 2%, by weight based on the total weight of the aqueous coating composition.

The aqueous coating composition of the present invention may be prepared with techniques known in the coating art. The process of preparing the aqueous coating composition may comprise admixing the aqueous dispersion of multi-stage polymeric particles with other optional components as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the aqueous coating composition may be dried, or be allowed to dry, at temperatures of from 5 to 25° C., or at an elevated temperature, for example, from higher than 25 to 60° C., to form a film (this is, coating). The aqueous coating composition of the present invention can provide coating films obtained therefrom, i.e., the coatings after drying, or allowing to dry, the aqueous coating composition applied to a substrate, such as Acacia, with excellent tannin blocking as indicated by a final b≤2.5 and delta b≤0.55 after storage at 50° C. for 48 hours and 80° C. for 48 hours, an early block resistance level of D-0 or better, and a sandability level of 3 or higher and preferably 4 or higher. The tannin blocking, early block resistance and sandability properties may be measured according to the test methods described in the Examples section.

The aqueous coating composition of the present invention can be applied to, and adhered to, various substrates. Examples of suitable substrates include concrete, cementious substrates, wood, metals, stones, elastomeric substrates, glass or fabrics. The coating composition is suitable for various coating applications, such as architecture coatings, marine and protective coatings, automotive coatings, wood coatings, coil coatings, and civil engineering coatings. The aqueous coating composition can be used alone, or in combination with other coatings to form multi-layer coatings.

Examples

Some embodiments of the invention will now be described in the following Examples, wherein all parts and percentages are by weight unless otherwise specified.

The following abbreviations are used in the examples:

EHA: 2-Ethylhexyl acrylate, CHMA: Cyclohexyl methacrylate, t-BMA: tert-Butyl methacrylate (available from BASF), IBOMA: Isobornyl methacrylate (available from BASF), MAA: Methacrylic acid, ST: styrene, MMA: Methyl methacrylate, PEM: Phosphoethyl methacrylate, and 3-MPA: 3-mercaptopropionic.

Hitenol AR1025 surfactant (25% active) (AR1025), available from DKS Co. Ltd., has the structure of

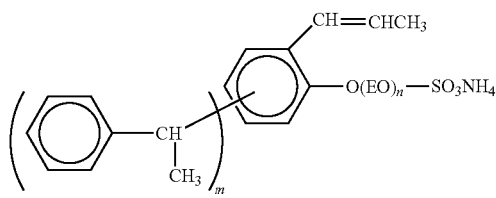

where m is 1-3.

Aerosol A-102 surfactant (31% active) (A-102), available from Solvay, is a polyethylene glycol alkyl (C10-C12) ether sulfosuccinate disodium salt.

Resoap SR 1025 surfactant (25% active) (SR 1025), available from Adeka Corporation, has the structure of

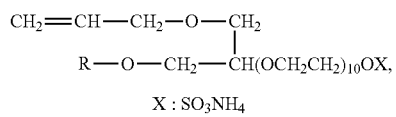

X : $SO_3NH_4$ where R is an alky group.

Latemul PD 104 surfactant (PD 104) (20% active), available from Kao, has the structure of

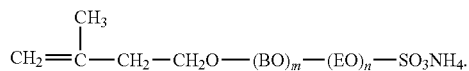

AMINOION RE1000 surfactant (RE1000) (30-31% active), available from Nippon Nyukazai Co., Ltd., comprises poly(oxy-1,2-ethanediyl), alpha.-sulfo-omega-(methylphenoxy)-ar-styrenated, 2-Propenoic acid, 2-methyl-2-(dimethylamino)ethyl ester salts.

RHODAPEX ES2186 surfactant (ES2186) (31% active), available from Solvay, contains non-polymerizable polyarylphenyl ether derivatives.

BYK024 silicone-containing defoamer, BYK022 defoamer, and BYK346 polyether modified siloxane dispersant are all available from BYK.

DOWANOL™ EB coalescent (Ethylene glycol monobutyl ether), DOWANOL DPnB coalescent (Dipropylene glycol mono butyl ether), ACRYSOL™ RM-8W and ACRYSOL RM-5000 nonionic urethane rheology modifiers, OROTAN™ 731A dispersant, ECOSURF™ BD 109 wetting agent are all available from The Dow Chemical Company (DOWANOL, ACRYSOL, OROTAN, and ECOSURF are trademarks of The Dow Chemical Company).

Tego Airex 902W defoamer is available from Tego.

Ti-Pure R706 $TiO_2$ pigment is available from Sinopharm Chemical Company.

XTAIN L44 additive (30% active), available from Halox, is an ammonium stabilized zirconium salt.

Zinc ammonia solution (30% active) is an ammonium stabilized zinc salt.

The following standard analytical equipment and methods are used in the Examples.

Tannin Blocking Test

Quantitative measurement of the tannin blocking was conducted using a BYK colorimeter (BYK 6834) with dimension L for lightness, and a and b representing for the color-opponent dimensions, based on nonlinearly compressed CIE XYZ color space coordinates, according to the ASTM D2244-15A method. L, a, b values were recorded and delta b (Ab) was calculated and used to indicate difference of yellow stain of coatings.

Coating panels were prepared as follows: A primer, that is, a coating composition to be tested, was applied on Acacia wood and cured at room temperature (RT) for 2 hours (hr) to form a first primer layer. After sanding the first primer layer, a second layer of the primer was applied and then cured at room temperature for 2 hours. A top coat (ROSHIELD™ 3311 aqueous acrylic emulsion available from The Dow Chemical Company, ROSHIELD is a trademark of The Dow Chemical Company) was then applied on the second layer of the primer and cured at room temperature for 2 hours. Then initial color ($L_1$, $a_1$, and $b_1$ values) of the obtained panels was measured. Then, the panels were placed into an oven at 50° C. for 48 hours, and then at 80° C. for another 48 hours. After that, final color ($L_2$, $a_2$, and $b_2$ values) was measured. Delta b values are determined by the following equations: delta $b=b_2-b_1$.

The final b value ($b_2$)≤2.5 and delta b≤0.55 are acceptable.

Sandability

An aqueous coating composition to be tested was applied on Acacia wood at about 80-90 gram per square meter ($g/m^2$) and cured at room temperature for 2 hours. The resultant coating film was then sanded. Sandability means how easy to get a smooth surface when sanding a coating. Sandability was rated on a scale of 1-5, based on the shape of dust created by sanding:

5—Powder; 4—Powder to strip; 3—Strip; 2—Large aggregate; and 1—Not sandable.

Sandability rating as 3 or higher is acceptable.

Early Block Resistance

Early block resistance was measured according to HG/T 3828-2006 standard (Water based coating for indoor woodenware). A first layer of an aqueous coating composition to be tested was brushed onto a wood panel (7 cm×5 cm) at about 80-90 $g/m^2$ of the wood panel, cured at 50° C. for 60 minutes, and then cooled to room temperature, followed by sanding with sand paper. Then a second layer of the coating composition was brushed onto the coated wood block at 80-90 $g/m^2$ and cured at 40° C. for 30 minutes, and then cooled to room temperature. Two coated wood blocks were then stacked together face to face with 2 kg (kilograms) weight on them and are placed into an oven at 50° C. for 4 hours. Then, the 2 kg weight was removed and the two stacked wood blocks were balanced at room temperature for 1 hour. The two stacked wood blocks were then separated from each other to evaluate the early block resistance. The rating of the early block resistance property is defined by the separating force and the area of damaging:

Separating force: A=Separated freely; B=Separate after a light knock; C=Separate after applying a light pull force; D=Separate after applying moderate pull force; E=Separate after applying maximum pull force; F=Separate by using tools.

Area of damaging: 0=No damage; 1=<1% damage; 2=1%-5% damage; 3=6%-20% damage; 4=21%-50% damage; 5=>50% damage.

A-0 is the best, F-5 is the worst. The early block resistance should be D-0 or better to be acceptable.

Tg Measurement by DSC

A 5-10 milligram (mg) sample was analyzed in a sealed aluminum pan on a TA Instrument DSC Q2000 fitted with an auto-sampler under nitrogen ($N_2$) atmosphere. Tg measurement was conducted with three cycles including, from −50 to 200° C., 10° C./min (1$^{st}$ cycle, then hold for 5 minutes to erase thermal history of the sample), from 200 to −50° C., 10° C./min (2$^{nd}$ cycle), and from −50 to 200° C., 10° C./min (3$^{rd}$ cycle). Tg was obtained from the 3$^{rd}$ cycle by taking the mid-point in the heat flow versus temperature transition as the Tg value.

Example (Ex) 1

The aqueous dispersion of Ex 1 was prepared as follows,
Preparation of Monomer Emulsion 1 (ME1): AR1025 surfactant (29.2 g, 25% active) was dissolved in deionized (DI) water (218.3 g), with stirring. Then monomers for preparing ME1 as given in Table 1 were slowly added to the agitated solution.

Preparation of Monomer Emulsion 2 (ME2): AR1025 surfactant (12.44 g, 25% active) was dissolved in DI water (96.56 g), with stirring. Then monomers for preparing ME2 as given in Table 1 were slowly added to the agitated solution.

Reactor preparation: A solution containing AR1025 surfactant (25% active, 41.25 g) and DI water (656.27 g) was placed in a 3 litter (L) 4-neck round-bottom flask equipped with a thermocouple, a cooling condenser and an agitator, and was heated to 86° C. under N$_2$.

Polymerization step: An aqueous initiator solution of ammonia persulfate (APS) (2.1 g APS dissolved in 38 g DI water), and 3.3% of the ME1 were added to the flask, followed by a rinse of DI water (25 g). In about 5 minutes, initiation of polymerization was confirmed by the increase of temperature by 3° C. and a change of the external appearance of the reaction mixture. After heat generation ended, the remainder of the ME1 was gradually added to the flask over 70 minutes, with stirring. At the same time, an aqueous initiator solution of APS (0.75 g APS dissolved in 92.76 g DI water) was gradually added to the flask over 70 minutes. Polymerization reaction temperature was maintained at 84-86° C. After the addition was completed, vessels and the feeding pipes leading into the flask were rinsed with DI water (43 g), and the rinse was added back to the flask. ME2 was then added in the same manner as the ME1 over 30 minutes. At the same time, an aqueous initiator solution of APS (0.32 g APS dissolved in 39.75 g DI water) was gradually added to the flask over 30 minutes. Upon completing the addition, the reaction mixture was held at 70° C. for 60 minutes.

Neutralization step: The content of the flask was cooled to 50° C., neutralized to a pH of 7.0-8.5 by ammonia (30%), held at 45-50° C. for 10 minutes, and then cooled to room temperature.

The resulting dispersion had a solids content of around 40-42%.

Ex 2

The above obtained Ex 1 dispersion (73 g) was mixed with XTAIN L44 (2 g) and DI water at room temperature to give the resultant mixture with a final pH of about 8.6 and a solids content of around 38-40%.

Ex 3

The above obtained Ex 1 dispersion (73 g) was mixed with zinc ammonia solution (3 g) and DI water at room temperature give to the resultant mixture with a final pH of about 8.6 and a solids content of around 38-40%.

Ex 4

The aqueous dispersion of Ex 4 was prepared as follows,
Preparation of Monomer Emulsion 1 (ME1): RE1000 surfactant (23.62 g, 30.90% active) was dissolved in DI water (218.3 g), with stirring. Then monomers for preparing ME1 as given in Table 1 were slowly added to the agitated solution.

Preparation of Monomer Emulsion 2 (ME2): RE1000 surfactant (10.06 g, 30.90% active) was dissolved in DI water (96.56 g), with stirring. Then monomers for preparing ME2 as given in Table 1 were slowly added to the agitated solution.

Reactor preparation: A solution containing RE1000 surfactant (30.90% active, 33.59 g) and DI water (656.27 g) was placed in the same flask as in Ex 1 and heated to 86° C. under N$_2$.

Then, the polymerization step and neutralization step were conducted according to the same procedure as those described in Ex 1 above. The obtained polymer dispersion had pH of 7.0-8.5 and a solids content of around 40-42%.

Ex 5

The above obtained Ex 4 dispersion (73 g) was mixed with XTAIN L44 (2 g) and DI water at room temperature to give the resultant mixture with a final pH of about 8.6 and a solids content of around 38-40%.

Comparative (Comp) Ex A

The aqueous dispersion of Comp Ex A was prepared as follows,
Preparation of Monomer Emulsion 1 (ME1): A-102 surfactant (23.55 g, 31% active) was dissolved in DI water (224 g), with stirring. Then monomers for preparing ME1 as given in Table 1 were slowly added to the agitated solution.

Preparation of Monomer Emulsion 2 (ME2): A-102 surfactant (10.03 g, 31% active) was dissolved in DI water (99 g), with stirring. Then monomers for preparing ME2 as given in Table 1 were slowly added to the agitated solution.

Reactor preparation: A solution containing A-102 surfactant (31% active, 33.48 g) and DI water (664.27 g) was placed in the same flask as in Ex 1 and heated to 85° C. under N$_2$.

Then, the polymerization step and neutralization step were conducted according to the same procedure as those described in Ex 1 above. The obtained polymer dispersion had a pH of 7.0-8.5 and a solids content of around 40-42%.

Comp Ex B

The aqueous dispersion of Comp Ex B was prepared as follows,
Preparation of Monomer Emulsion 1 (ME1): PD 104 surfactant (36.50 g, 20% active) was dissolved in DI water (211.30 g), with stirring. Then monomers for preparing ME1 as given in Table 1 were slowly added to the agitated solution.

Preparation of Monomer Emulsion 2 (ME2): PD 104 surfactant (15.55 g, 20% active) was dissolved in DI water (93.56 g), with stirring. Then monomers for preparing ME2 as given in Table 1 were slowly added to the agitated solution.

Reactor preparation: A solution containing PD 104 surfactant (20% active, 51.90 g) and DI water (646.27 g) was placed in the same flask as in Ex 1 and heated to 85° C. under $N_2$.

Then, the polymerization step and neutralization step were conducted according to the same procedure as those described in Ex 1 above. The obtained polymer dispersion had a pH of 7.0-8.5 and a solids content of around 40-42%.

Comp Ex C

The aqueous dispersion of Comp Ex C was prepared as follows,

Preparation of Monomer Emulsion 1 (ME1): SR 1025 surfactant (29.20 g, 25% active) was dissolved in DI water (218.30 g), with stirring. Then monomers for preparing ME1 as given in Table 1 were slowly added to the agitated solution.

Preparation of Monomer Emulsion 2 (ME2): SR 1025 surfactant (12.44 g, 25% active) was dissolved in DI water (96.56 g), with stirring. Then monomers for preparing ME2 as given in Table 1 were slowly added to the agitated solution.

Reactor preparation: A solution containing SR 1025 surfactant (25% active, 41.52 g) and DI water (656.27 g) was placed in the same flask as in Ex 1 and was heated to 85° C. under $N_2$.

Then, the polymerization step and neutralization step were conducted according to the same procedure as those described in Ex 1 above. The obtained polymer dispersion had a pH of 7.0-8.5 and a solids content of around 40-42%.

Comp Ex D

The aqueous dispersion of Comp Ex D was prepared as follows,

Preparation of Monomer Emulsion 1 (ME1): ES2186 surfactant (23.55 g, 31% active) was dissolved in DI water (224 g), with stirring. Then monomers for preparing ME1 as given in Table 1 were slowly added to the agitated solution.

Preparation of Monomer Emulsion 2 (ME2): ES2186 surfactant (10.03 g, 31% active) was dissolved in DI water (99 g), with stirring. Then monomers for preparing ME2 as given in Table 1 were slowly added to the agitated solution.

Reactor preparation: A solution containing A-102 surfactant (31% active, 33.48 g) and DI water (664.27 g) was placed in the same flask as in Ex 1 and heated to 85° C. under $N_2$.

Then, the polymerization step and neutralization step were conducted according to the same procedure as those described in Ex 1 above. The obtained polymer dispersion had a pH of 7.0-8.5 and a solids content of around 40-42%.

Comp Ex E

The aqueous dispersion of Comp Ex E was prepared as follows,

Preparation of Monomer Emulsion 1 (ME1): RE1000 surfactant (14.55 g, 31% active) was dissolved in DI water (141.5 g), with stirring. Then monomers for preparing ME1 as given in Table 1 were slowly added to the agitated solution. After that, 3-MPA (1.33 g) was further added with stirring.

Preparation of Monomer Emulsion 2 (ME2): RE1000 surfactant (33.59 g, 31% active) was dissolved in DI water (338.90 g), with stirring. Then monomers for preparing ME2 as given in Table 1 were slowly added to the agitated solution.

A solution containing RE1000 surfactant (31% active, 71.98 g) and DI water (859.33 g) was placed in a 5 L 4-neck round-bottom flask equipped with a thermocouple, a cooling condenser and an agitator, and was heated to 85° C. under $N_2$. An aqueous initiator solution of APS (2.88 g APS dissolved in 42.88 g DI water), and 5.31% of ME1 were added to the flask. DI water (30 g) was used to rinse the above vessels. In about 5 minutes, initiation of polymerization was confirmed by the increase of temperature by 3° C. and a change of the external appearance of the reaction mixture. After heat generation ended, the remainder of the ME1 was gradually added to the flask over 50 minutes, with stirring. At the same time, an aqueous initiator solution of APS (1.46 g APS dissolved in 137.22 g DI water) was gradually added to the flask over 50 minutes. Polymerization reaction temperature was maintained at 84-86° C. After the addition was completed, a rinse of DI water (55 g) was added back to the flask.

ME2 was then added in the same manner as ME1 over 110 minutes. At the same time, an aqueous initiator solution of APS (2.55 g APS dissolved in 160.37 g DI water) was gradually added to the flask over 110 minutes. Upon completing the addition, the reaction mixture was held at 70° C. for 60 minutes. The content of the flask was cooled to 50° C., neutralized to pH 7.0-8.5 by ammonia (30%), and held at 45-50° C. for 10 minutes, followed by cooling to room temperature to give a polymer emulsion with a solids content of around 40-42%.

Comp Ex F

The aqueous dispersion of Comp Ex F was prepared as follows,

Preparation of Monomer Emulsion 1 (ME1): RE1000 surfactant (14.55 g, 31% active) was dissolved in DI water (141.5 g), with stirring. Then monomers for preparing ME1 as given in Table 1 were slowly added to the agitated solution. After that, 3-MPA (1.33 g) was further added with stirring.

Preparation of Monomer Emulsion 2 (ME2): RE1000 surfactant (33.59 g, 31% active) was dissolved in DI water (338.90 g), with stirring. Then monomers for preparing ME2 as given in Table 1 were slowly added to the agitated solution.

Reactor preparation: A solution containing RE1000 surfactant (31% active, 71.98 g) and DI water (859.33 g) was placed in the same flask as in Comp Ex E and heated to 85° C. under $N_2$.

Then, the polymerization step and neutralization step were conducted according to the same procedure as those described in Comp Ex E above. The obtained polymer dispersion had a pH of 7.0-8.5 and a solids content of around 40-42%.

Comp Ex G

The aqueous dispersion of Comp Ex G was prepared as follows,

Preparation of Monomer Emulsion 1 (ME1): RE1000 surfactant (14.55 g, 31% active) was dissolved in DI water (141.5 g), with stirring. Then monomers for preparing ME1 as given in Table 1 and t-BMA (192.88 g) were slowly added to the agitated solution. After that, 3-MPA (1.33 g) was further added with stirring.

Preparation of Monomer Emulsion 2 (ME2): RE1000 surfactant (33.59 g, 31% active) was dissolved in DI water (338.90 g), with stirring. Then monomers for preparing ME2 as given in Table 1 were slowly added to the agitated solution.

Reactor preparation: A solution containing RE1000 surfactant (31% active, 71.98 g) and DI water (859.33 g) was placed in the same flask as in Comp Ex E and heated to 85° C. under $N_2$.

Then, the polymerization step and neutralization step were conducted according to the same procedure as those described in Comp Ex E above. The obtained polymer dispersion had a pH of 7.0-8.5 and a solids content of around 40-42%.

Comp Ex K

The above obtained Comp Ex G dispersion (73 g) was mixed with XTAIN L44 (2 g) and DI water at room temperature to give the resultant mixture with a final pH of about 8.6 and a solids content of around 38-40%.

Comp Ex H

The aqueous dispersion of Comp Ex H was prepared as follows,

Preparation of Monomer Emulsion 1 (ME1): RE1000 surfactant (14.55 g, 31% active) was dissolved in DI water (141.5 g), with stirring. Then monomers for preparing ME1 as given in Table 1 and IBOMA (192.88 g) were slowly added to the agitated solution. After that, 3-MPA (1.33 g) was further added with stirring.

Preparation of Monomer Emulsion 2 (ME2): RE1000 surfactant (33.59 g, 31% active) was dissolved in DI water (338.90 g), with stirring. Then monomers for preparing ME2 as given in Table 1 were slowly added to the agitated solution.

Reactor preparation: A solution containing RE1000 surfactant (31% active, 71.98 g) and DI water (859.33 g) was placed in the same flask as in Comp Ex E and heated to 85° C. under $N_2$.

Then, the polymerization step and neutralization step were conducted according to the same procedure as those described in Comp Ex E above. The obtained polymer dispersion had a pH of 7.0-8.5 and a solids content of around 40-42%.

Comp Ex L

The above obtained Comp Ex H dispersion (73 g) was mixed with XTAIN L44 (2 g) and DI water at room temperature to give the resultant mixture with a final pH of about 8.6 and a solids content of around 38-40%.

Ex 6

The aqueous dispersion of Ex 6 was prepared as follows,

Preparation of Monomer Emulsion 1 (ME1): AR1025 surfactant (18.36 g, 25% active) was dissolved in DI water (141.5 g), with stirring. Then monomers for preparing ME1 as given in Table 1 were slowly added to the agitated solution. After that, 3-MPA (1.33 g) was further added stirring.

Preparation of Monomer Emulsion 2 (ME2): AR1025 surfactant (42.84 g, 25% active) was dissolved in DI water (338.90 g), with stirring. Then monomers for preparing ME2 as given in Table 1 were slowly added to the agitated solution.

Reactor preparation: A solution containing AR1025 surfactant (91.84 g, 25% active) and DI water (859.33 g) was placed in the same flask as in Comp Ex E and heated to 85° C. under $N_2$.

Then, the polymerization step and neutralization step were conducted according to the same procedure as those described in Comp Ex E above. The obtained polymer dispersion had a pH of 7.0-8.5 and a solids content of around 40-42%.

Ex 7

The aqueous dispersion of Ex 7 was prepared as follows,

Preparation of Monomer Emulsion 1 (ME1): RE1000 surfactant (14.55 g, 31% active) was dissolved in DI water (141.5 g), with stirring. Then, CHMA (192.69 g), MMA (208.30 g), and MAA (44.48 g) were slowly added to the agitated solution. After that, 3-MPA (1.33 g) was further added with stirring.

Preparation of Monomer Emulsion 2 (ME2): RE1000 surfactant (33.59 g, 31% active) was dissolved in DI water (338.90 g), with stirring. Then ST (646.41 g) and EHA (397.34 g)

Reactor preparation: A solution containing RE1000 surfactant (31% active, 71.98 g) and DI water (859.33 g) was placed in the same flask as in Comp Ex E heated to 85° C. under $N_2$.

Then, the polymerization step and neutralization step were conducted according to the same procedure as those described in Comp Ex E above. The obtained polymer dispersion had pH of 7.0-8.5 and solids of around 40-42%. The obtained dispersion (73 g) was further mixed with XTAIN L44 (2 g) and DI water at room temperature to give the resulting mixture with a final pH about 8.6 and a solids content of 38-40%.

Ex 8

The aqueous dispersion of Ex 8 was prepared as follows,

Preparation of Monomer Emulsion 1 (ME1): RE1000 surfactant (14.55 g, 31% active) was dissolved in DI water (141.5 g), with stirring. Then monomers for preparing ME1 as given in Table 1 were slowly added to the agitated solution. After that, 3-MPA (1.33 g) was further added with stirring.

Preparation of Monomer Emulsion 2 (ME2): RE1000 surfactant (33.59 g, 31% active) was dissolved in DI water (338.90 g), with stirring. Then monomers for preparing ME2 as given in Table 1 were slowly added to the agitated solution.

Reactor preparation: A solution containing RE1000 surfactant (31% active, 71.98 g) and DI water (859.33 g) was placed in the same flask as in Comp Ex E and heated to 85° C. under $N_2$.

Then, the polymerization step and neutralization step were conducted according to the same procedure as those described in Comp Ex E above. The obtained polymer dispersion had a pH of 7.0-8.5 and a solids content of around 40-42%.

Ex 9

The above obtained Ex 8 dispersion (73 g) was mixed with XTAIN L44 (2 g) and DI water at room temperature to give the resultant mixture with a final pH of about 8.6 and a solids content of around 38-40%.

Comp Ex N

The aqueous dispersion of Comp Ex N was prepared as follows,

Preparation of Monomer Emulsion 1 (ME1): RE1000 surfactant (34.95 g, 30.90% active) was dissolved in DI water (370.08 g), with stirring. Then monomers for preparing ME1 as given in Table 1 were slowly added to the agitated solution.

Preparation of Monomer Emulsion 2 (ME2): RE1000 surfactant (14.89 g, 30.90% active) was dissolved in DI water (95.31 g), with stirring. Then monomers for preparing ME2 as given in Table 1 were slowly added to the agitated solution.

A solution containing RE1000 surfactant (30.90% active, 49.71 g) and DI water (971.28 g) was placed in the same flask as in Comp Ex E and heated to 86° C. under $N_2$. An aqueous initiator solution of APS (3.16 g APS dissolved in 56.34 g DI water), and 3.3% of ME1 were added to the flask. DI water (25 g) was used to rinse the above vessels. In about 5 minutes, initiation of polymerization was confirmed by the increase of temperature by 3° C. and a change of the external appearance of the reaction mixture. After heat generation ended, the remainder of the ME1 was gradually added to the flask over 80 minutes, with stirring. At the same time, an aqueous initiator solution of APS (1.13 g APS dissolved in 139.38 g DI water) was gradually added to the flask over 70 minutes. Polymerization reaction temperature was maintained at 84-86° C. After the addition was completed, a rinse of DI water (43 g) was added back to the flask.

The ME2 was then added in the same manner as the ME1 over 20 minutes. At the same time, an aqueous initiator solution of APS (0.48 g APS dissolved in 57.00 g DI water) was gradually added to the flask over 20 minutes. Upon completing the addition, the reaction mixture was held at 70° C. for 60 minutes. The reaction was cooled to 50° C., neutralized to pH 7.0-8.5 by ammonia (30%), held at 45-50° C. for 10 minutes, and then cooled to room temperature to get a polymer emulsion with a solids content of around 40-42%.

Comp Ex O

The aqueous dispersion of Comp Ex O was prepared as follows,

Preparation of Monomer Emulsion 1 (ME1): RE1000 surfactant (14.81 g, 31% active) was dissolved in DI water (111.78 g), with stirring. Then monomers for preparing ME1 as given in Table 1 were slowly added to the agitated solution. After that, 3-MPA (0.92 g) was further added with stirring.

Preparation of Monomer Emulsion 2 (ME2): RE1000 surfactant (34.55 g, 31% active) was dissolved in DI water (279.92 g), with stirring. Then monomers for preparing ME2 as given in Table 1 were slowly added to the agitated solution.

A solution containing RE1000 surfactant (31% active, 74.06 g) and DI water (842.66 g) was placed in the same flask as in Comp Ex E and heated to 85° C. under $N_2$. An aqueous initiator solution of APS (2.97 g APS dissolved in 44.12 g DI water), and 5.31% of ME1 were added to the flask. DI water (30 g) was used to rinse the above vessels. In about 5 minutes, initiation of polymerization was confirmed by the increase of temperature by 3° C. and a change of the external appearance of the reaction mixture. After heat generation ended, the remainder of the ME1 was gradually added to the flask over 30 minutes, with stirring. At the same time, an aqueous initiator solution of APS (1.50 g APS dissolved in 141.17 g DI water) was gradually added to the flask over 30 minutes. Polymerization reaction temperature was maintained at 84-86° C. After the addition was completed, a rinse of DI water (55 g) was added back to the flask.

The ME2 was then added in the same manner as ME1 over 70 minutes. At the same time, an aqueous initiator solution of APS (2.62 g APS dissolved in 165.00 g DI water) was gradually added to the flask over 70 minutes. Upon completing the addition, the reaction mixture was held at 70° C. for 60 minutes. The reaction was cooled to 50° C., neutralized to pH 7.0-8.5 by ammonia (30%), and then held at 45-50° C. for 10 minutes. Then the reaction was cooled to room temperature to get a final polymer dispersion with a solids content of around 40-42%.

Tgs of multistage polymeric particles in the aqueous dispersions of Exs 1, 4 and 6-8, including Tgs of $1^{st}$ stage polymers and $2^{nd}$ stage polymers are given in Table 2.

TABLE 1

Monomer compositions for preparing multistage polymeric particles

| | Monomers for preparing ME1 (for forming $1^{st}$ stage polymer) | | | | | | Monomers for preparing ME2 (for forming $2^{nd}$ stage polymer) | | | | |
|---|---|---|---|---|---|---|---|---|---|---|---|
| Dispersions | CHMA (g) | EHA (g) | MMA (g) | MAA (g) | PEM (g) | ST (g) | MMA (g) | CHMA (g) | ST (g) | EHA (g) | MAA (g) |
| Ex 1 | 319.6 | 384.97 | 5.81 | 10.17 | 5.81 | 0.0 | 152.72 | 0.0 | 155.83 | 0.00 | 3.12 |
| Ex 4 | 164.09 | 384.98 | 5.81 | 10.17 | 5.81 | 155.53 | 152.42 | 155.53 | 0.0 | 0.00 | 3.11 |
| Comp Ex A | 319.60 | 384.97 | 5.81 | 10.17 | 5.81 | 0.0 | 152.41 | 0.0 | 155.52 | 0.00 | 3.11 |
| Comp Ex B | 319.60 | 384.97 | 5.81 | 10.17 | 5.81 | 0.0 | 152.41 | 0.0 | 155.52 | 0.00 | 3.11 |
| Comp Ex C | 319.60 | 384.97 | 5.81 | 10.17 | 5.81 | 0.0 | 152.41 | 0.0 | 155.52 | 0.00 | 3.11 |
| Comp Ex D | 319.60 | 384.97 | 5.81 | 10.17 | 5.81 | 0.0 | 152.41 | 0.0 | 155.52 | 0.00 | 3.11 |
| Comp Ex E | 0.00 | 0.00 | 408.44 | 30.33 | 7.14 | 0.0 | 0.00 | 0.00 | 645.75 | 395.74 | 0.00 |
| Comp Ex F | 0.00 | 0.00 | 215.6 | 30.33 | 7.10 | 192.88 | 0.00 | 0.00 | 645.75 | 395.74 | 0.00 |
| Comp Ex G | 0.00 | 0.00 | 215.6 | 30.33 | 7.10 | 0.00 | 0.00 | 0.00 | 645.75 | 395.74 | 0.00 |

TABLE 1-continued

Monomer compositions for preparing multistage polymeric particles

| Dispersions | Monomers for preparing ME1 (for forming 1st stage polymer) | | | | | | Monomers for preparing ME2 (for forming 2nd stage polymer) | | | | |
|---|---|---|---|---|---|---|---|---|---|---|---|
| | CHMA (g) | EHA (g) | MMA (g) | MAA (g) | PEM (g) | ST (g) | MMA (g) | CHMA (g) | ST (g) | EHA (g) | MAA (g) |
| Comp Ex H | 0.00 | 0.00 | 215.6 | 30.33 | 7.10 | 0.00 | 0.00 | 0.00 | 645.75 | 395.74 | 0.00 |
| Ex 6 | 192.69 | 0.00 | 208.3 | 44.48 | 0.00 | 0.00 | 0.00 | 0.00 | 646.41 | 397.34 | 0.00 |
| Ex 7* | 192.69 | 0.00 | 208.3 | 44.48 | 0.00 | 0.00 | 0.00 | 0.00 | 646.41 | 397.34 | 0.00 |
| Comp Ex N | 363.58 | 565.01 | 9.80 | 17.20 | 9.80 | 262.86 | 150.46 | 153.54 | 0.00 | 0.00 | 3.08 |
| Comp Ex O | 132.40 | 0.00 | 143.11 | 30.61 | 0.00 | 0.00 | 0.00 | 0.00 | 820.25 | 404 | 0.00 |
| Ex 8 | 192.88 | 0.00 | 215.6 | 30.33 | 7.10 | 0.00 | 0.00 | 0.00 | 645.75 | 395.74 | 0.00 |

*Monomers given here were those used for preparing multistage polymeric particles and Tgs of the multistage polymeric particles obtained in Ex 7 (The aqueous dispersion of Ex 7 further contained XTAIN L44 additive).

TABLE 2

Tgs of multistage polymeric particles and polymers therein

| Dispersion | Tg of 1st stage polymer[1] (° C.) | Tg of 2nd stage polymer[1] (° C.) | Tg of Multistage polymeric particles[2] (° C.) |
|---|---|---|---|
| Ex 1 | 1.74 | 103.1 | 32.2 |
| Ex 4 | 4.9 | 101.7 | 33.9 |
| Ex 6 | 113.5 | 33.9 | 57.8 |
| Ex 7 | 126.0 | 33.6 | 61.3 |
| Ex 8 | 119.7 | 33.6 | 59.4 |

[1]Tgs of 1st stage polymer and 2nd stage polymer were obtained from DSC measurement above;
[2]Tgs of multistage polymeric particles were calculated by the equation described above.

Comp Ex M One-stage Polymer Emulsion

AR1025 surfactant (48.14 g, 31% active) was dissolved in DI water (480.4 g), with stirring. Then monomers for preparing the ME3 as given in Table 3 were slowly added to the resultant agitated solution to obtain a monomer emulsion (ME). A solution containing AR1025 surfactant (31% active, 23.99 g) and DI water (907.33 g) was placed in the same flask as in Comp Ex E and heated to 85° C. under $N_2$. An aqueous initiator solution of APS (2.88 g APS dissolved in 42.88 g DI water), and 2.31% of the ME were added to the flask. DI water (83 g) was used to rinse the above vessels. In about 5 minutes, initiation of polymerization was confirmed by the increase of temperature by 3° C. and a change of the external appearance of the reaction mixture. After heat generation ended, the remainder of the ME was added gradually to the flask over 170 minutes, with stirring. At the same time, an aqueous initiator solution of APS (4.01 g APS dissolved in 297.59 g DI water) was gradually added to the flask over 170 minutes. Polymerization reaction temperature was maintained at 84-86° C. After the addition was completed, a rinse of DI water (40 g) was added back to the flask. Upon completing the addition, the reaction mixture was held at 70° C. for 60 minutes. The reaction was cooled to 50° C. and then neutralized to pH 7.0-8.5 by ammonia (30%). The mixture in the flask was held at 45-50° C. for 10 minutes and then cooled to room temperature to get a polymer emulsion with a solids content of around 40-42%.

Comp Ex I One-stage Polymer Emulsion

RE1000 surfactant (48.14 g, 31% active) was dissolved in DI water (480.4 g), with stirring. Then monomers for preparing the ME3 as given in Table 3 were slowly added to the resultant agitated solution to obtain a monomer emulsion (ME). A solution containing RE1000 surfactant (31% active, 23.99 g) and DI water (907.33 g) was placed in the same flask as in Comp Ex E and heated to 85° C. under $N_2$. An aqueous initiator solution of APS (2.88 g APS dissolved in 42.88 g DI water), and 2.31% of the ME were added to the flask. DI water (83 g) was used to rinse the above vessels. In about 5 minutes, initiation of polymerization was confirmed by the increase of temperature by 3° C. and a change of the external appearance of the reaction mixture. After heat generation ended, the remainder of the ME was added gradually to the flask over 170 minutes, with stirring. At the same time, an aqueous initiator solution of APS (4.01 g APS dissolved in 297.59 g DI water) was gradually added to the flask over 170 minutes. Polymerization reaction temperature was maintained at 84-86° C. After the addition was completed, a rinse of DI water (40 g) was added back to the flask. Upon completing the addition, the reaction mixture was held at 70° C. for 60 minutes. The reaction was cooled to 50° C. and then neutralized to pH 7.0-8.5 by ammonia (30%). The mixture in the flask was held at 45-50° C. for 10 minutes and then cooled to room temperature to get a polymer emulsion with a solids content of around 40-42%.

TABLE 3

Monomer compositions for one-stage polymerization

| Dispersion | Surfactant (g) | Monomers for preparing ME | | | | | | |
|---|---|---|---|---|---|---|---|---|
| | | CHMA (g) | EHA (g) | MMA (g) | ST (g) | PEM (g) | MAA (g) | 3-MPA (g) |
| Comp Ex M | 48.14 | 192.88 | 395.74 | 215.6 | 645.75 | 7.10 | 30.33 | 1.33 |
| Comp Ex I | 48.14 | 192.88 | 395.74 | 215.6 | 645.75 | 7.10 | 30.33 | 1.33 |

Clear Coating Compositions

The as prepared aqueous dispersions were used as binders for preparing clear coating compositions. The binder (73 g), DOWANOL EB coalescent (4 g), DPnB (2 g), BYK346 wetting agent (0.5 g), Tego Airex 902W defoamer (0.3 g), ACRYSOL RM-8W rheology modifier (0.2 g), ACRYSOL RM-5000 rheology modifier (0.5 g), and water (19.5 g) were mixed and stirred at 600 rpm/min. The obtained clear coating compositions were evaluated according to the test methods described above. Properties of the obtained coating films are given in Table 4.

As shown in Table 4, the binders prepared in the presence of non-polymerizable surfactants (Comp Exs A and D) both provided coating films made therefrom with poor tannin blocking properties, as indicated by undesirably large final b or delta b values after heatage, and unacceptable early block resistance and sandability. The binders prepared in the presence of other polymerizable surfactants (except AR1025 or RE1000) (Comp Exs B and C) provided coating films with poor tannin blocking properties, unacceptable early block resistance, and poor sandability. The binders made from other hydrophobic monomers rather than CHMA (Comp Exs E-H) provided poor tannin blocking properties. Moreover, the binders of Comp Exs E-G also provided coating films with unacceptable early block resistance and sandability. The binders of Comp Exs I and M both prepared by one-stage polymerization provided coating films comprising thereof with poor early block resistance and sandability. The combination of metal salts with conventional binders (Comp Exs K and L) showed no significant improvement on tannin blocking property of the resultant coating films. The binder of Comp Ex K also provided coating films with unacceptable early block resistance. The binders prepared by two-stage polymerization process but at the stage ratio of 20:80 or 80:20 (Comp Exs N and O) both provided undesirably high final b values after heatage.

In contrast, coating compositions comprising aqueous dispersions of Exs 1, 4, 6 and 8 as binders all provided coatings films with desirably low final b and delta b values, indicating good tannin blocking properties. In addition, the combination of these aqueous dispersions with metal salts as binders (Exs 2, 3, 5 and 7) provided coating films with better tannin blocking properties as compared to Comp Exs K and L, indicating synergetic effects between the metal salts and the multistage polymers comprising structural units of both CHMA and RE1000 (or AR1025) on tannin blocking property. Moreover, the coating films made from Exs 1-8 all demonstrated satisfactory early block resistance (D-0 or better) and sandability (3 or higher).

TABLE 4

Properties of clear coating compositions

| Coating | Binder type | Initial | | | After heat-gage | | | | Early block resistance | Sandability |
|---|---|---|---|---|---|---|---|---|---|---|
| | | $L_1$ | $a_1$ | $b_1$ | $L_2$ | $a_2$ | $b_2$ | $\Delta b$ | | |
| Coating 1 | Ex 1 | 95.57 | −0.77 | 1.63 | 94.94 | −1.15 | 1.93 | 0.3 | D-0 | 3 |
| Coating 2 | Ex 2 | 95.27 | −0.79 | 0.5 | 95.66 | −0.98 | 1.02 | 0.52 | D-0 | 3.5 |
| Coating 3 | Ex 3 | 96.47 | −0.94 | 1.57 | 96.25 | −1.06 | 1.59 | 0.02 | D-0 | 3.5 |
| Coating 4 | Ex 4 | 96.15 | −1.03 | 2.06 | 95.87 | −1.26 | 2.44 | 0.38 | D-0 | 3 |
| Coating 5 | Ex 5 | 96.28 | −0.93 | 1.35 | 96.17 | −1.14 | 1.63 | 0.28 | D-0 | 4 |
| Comp Coating A | Comp Ex A | 97.58 | −0.84 | 2.00 | 97.05 | −0.89 | 2.87 | 0.87 | F-1 | 2 |
| Comp Coating B | Comp Ex B | 95.95 | −0.74 | 0.85 | 95.04 | −1.22 | 3.37 | 2.52 | F-1 | 2 |
| Comp Coating C | Comp Ex C | 96.07 | −0.76 | 0.85 | 94.9 | −1.27 | 3.51 | 2.66 | F-4 | 1 |
| Comp Coating D | Comp Ex D | 96.03 | −0.79 | 1.06 | 94.95 | −1.07 | 3.77 | 2.71 | F-1 | 2 |
| Comp Coating E | Comp Ex E | 95.74 | −1.21 | 3.4 | 95.63 | −1.37 | 3.98 | 0.58 | D-2 | 2 |
| Comp Coating F | Comp Ex F | 95.51 | −1.07 | 2.10 | 95.52 | −1.11 | 2.69 | 0.59 | F-5 | 1 |
| Comp Coating G | Comp Ex G | 95.76 | −1.10 | 3.28 | 95.83 | −1.09 | 3.85 | 0.57 | F-5 | 1 |
| Comp Coating H | Comp Ex H | 96.05 | −0.63 | 1.46 | 95.94 | −0.75 | 2.58 | 1.02 | C-1 | 4 |
| Comp Coating I | Comp Ex I | 97.03 | −0.93 | 1.65 | 96.96 | −0.93 | 1.87 | 0.22 | F-5 | 2 |
| Comp Coating K | Comp Ex K | 94.61 | −0.38 | 2.84 | 94.73 | −0.36 | 2.97 | 0.13 | F-1 | 2 |

TABLE 4-continued

Properties of clear coating compositions

| Coating | Binder type | Initial $L_1$ | $a_1$ | $b_1$ | After heat-gage $L_2$ | $a_2$ | $b_2$ | $\Delta b$ | Early block resistance | Sandability |
|---|---|---|---|---|---|---|---|---|---|---|
| Comp Coating L | Comp Ex L | 93.77 | −0.42 | 2.81 | 93.24 | −0.30 | 3.02 | 0.21 | C-0 | 4 |
| Coating 6 | Ex 6 | 94.83 | −0.93 | 1.34 | 91.64 | −1.00 | 1.50 | 0.16 | D-0 | 3 |
| Coating 7 | Ex 7 | 94.66 | −0.52 | 1.84 | 94.48 | −0.51 | 1.88 | 0.04 | D-0 | 3 |
| Comp Coating M | Comp Ex M | 96.54 | −0.45 | 1.50 | 96.17 | −0.56 | 1.72 | 0.22 | F-5 | 1 |
| Comp Coating N | Comp Ex N | 94.25 | −0.74 | 2.15 | 93.57 | −0.68 | 3.14 | 0.99 | D-0 | 3 |
| Comp Coating O | Comp Ex O | 93.42 | −0.92 | 3.32 | 92.53 | −0.68 | 4.73 | 1.41 | F-5 | 2 |
| Coating 8 | Ex 8 | 97.27 | −0.54 | 2.23 | 97.26 | −0.53 | 2.34 | 0.11 | D-0 | 3 |

Paint Formulations

The paint formulations with ~17% PVC and 45% solids were prepared as follows: At the grind stage, water (5 g), OROTAN 731A dispersant (0.5 g), BYK022 defoamer (0.2 g), BD 109 wetting agent (0.2 g), and Ti-Pure R706 pigment (20 g) were mixed and stirred at 1500 rpm for 30 minutes. Then, at the letdown stage, the binder (60 g) was mixed with the slurry obtained from the grind stage (25.9 g), DOWANOL EB coalescent (4 g), DPnB (2 g), BYK346 wetting agent (0.5 g), Tego Airex 902W defoamer (0.3 g), ACRYSOL RM-8W rheology modifier (0.2 g), ACRYSOL RM-5000 rheology modifier (0.5 g), and water (7.6 g) with stirring at 600 rpm for 15 minutes. The obtained paint formulations were evaluated according to the test methods described above. Performance of the obtained paint films are given in Table 5. As compared to comparative paints F, G and H, inventive paints 1-4 all showed better tannin blocking resistance and comparable or better early block resistance and sandability.

TABLE 5

Properties of paint formulations

| Paint | Binder type | Initial $L_1$ | $a_1$ | $b_1$ | After heat-age $L_2$ | $a_2$ | $b_2$ | $\Delta b$ | Early block resistance | Sandability |
|---|---|---|---|---|---|---|---|---|---|---|
| Paint 1 | Ex 1 | 94.55 | −0.30 | 2.00 | 94.16 | −0.30 | 2.49 | 0.49 | D-0 | 3 |
| Paint 2 | Ex 2 | 96.56 | −0.48 | 1.56 | 96.39 | −0.65 | 1.86 | 0.3 | D-0 | 3 |
| Paint 3 | Ex 8 | 96.20 | −0.34 | 2.21 | 95.88 | −0.37 | 2.46 | 0.25 | D-0 | 3 |
| Paint 4 | Ex 9 | 97.27 | −0.54 | 2.23 | 97.21 | −0.54 | 2.35 | 0.12 | D-0 | 3 |
| Paint F | Comp Ex F | 93.91 | 0.03 | 4.15 | 93.8 | 0.03 | 4.69 | 0.54 | F-5 | 1 |
| Paint G | Comp Ex G | 93.76 | 0.14 | 4.66 | 93.54 | 0.12 | 5.31 | 0.65 | F-5 | 1 |
| Paint H | Comp Ex H | 93.37 | 0.08 | 5.08 | 93.63 | 0.14 | 5.55 | 0.47 | C-1 | 4 |

What is claimed is:

1. An aqueous dispersion comprising:
   (i) multistage polymeric particles having a Tg in the range of from 0 to 80° C. and comprising a polymer A in a first stage and a polymer B in a second stage at a weight ratio of the polymer A to polymer B in the range of from 78:22 to 22:78,
      wherein the Tg difference between the polymer A and the polymer B is 40° C. or more and the Tg of polymer A is higher than the Tg of polymer B, and
   wherein the multistage polymeric particles comprise, by weight based on the weight of the multistage polymeric particles,
      (a) from 10% to 40% of structural units of a cycloalkyl (meth)acrylate,
      (b) from 40% to 85% of structural units of a hydrophobic monomer,
      (c) from 0.5% to 10% of structural units of an ethylenically unsaturated monomer carrying at least one functional group selected from a carboxyl, carboxylic anhydride, sulfonic acid, amide, sulfonate, phosphoric acid, phosphonate, phosphate, or hydroxyl group, or a salt thereof,
      (d) structural units of a polymerizable surfactant having the structure of formula (I),

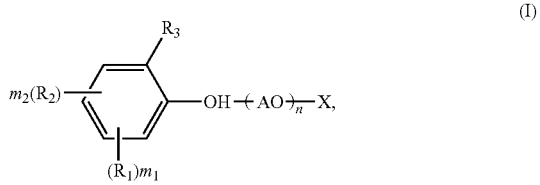

wherein $R_1$ is a phenyl group or a phenyl substituted alkyl group; $m_1$ is 1, 2, 3 or 4, $R_2$ is an alkyl group or a substituted alkyl group; $m_2$ is 0 or 1; $R_3$ is a hydrogen atom; an alkyl group; or —C($R_4$)=C$R_5R_6$, wherein $R_4$, $R_5$, and $R_6$ are each independently hydrogen or an alkyl group having 1 to 22 carbon atoms; A represents an alkylene group or a substituted alkylene group, having 2 to 4 carbon atoms; n is an integer of from 1 to 100; and X represents hydrogen or an anionic hydrophilic group selected from —(CH$_2$)$_a$—SO$_3$M, —(CH$_2$)$_b$—COOM, —PO$_3$M$_2$, —P(Z)O$_2$M, or —CO—CH$_2$—CH(SO$_3$M)—COOM, wherein a and b are each independently an integer of from 0 to 4, Z represents a residual obtained by removing X from the general formula (I), and each M represents hydrogen, an alkali metal cation, an alkaline earth metal cation, NH$_4^\pm$, an aminium ion having an ethylenically unsaturated bond, an imidazolium ion having an ethylenically unsaturated bond, a pyridinium ion having an ethylenically unsaturated bond, a pyrrolidinium ion having an ethylenically unsaturated bond, or a piperidinium ion having an ethylenically unsaturated bond; provided that only one of $R_3$ and X contains an ethylenically unsaturated bond; and optionally (e) structural units of an additional ethylenically nonionic monomer;

wherein the multistage polymeric particles are admixed with (ii) from 0.1 to 5%, by weight based on the weight of the multistage polymeric particles, of a metal salt.

2. The aqueous dispersion of claim 1, wherein the polymer A comprises: (a1) structural units of the cycloalkyl (meth)acrylate; (a2) structural units of the ethylenically unsaturated monomer carrying at least one functional group; (a3) structural units of the hydrophobic monomer, an additional ethylenically unsaturated nonionic monomer, or mixtures thereof; and optionally, (a4) structural units of the polymerizable surfactant; and wherein the polymer B comprises, by weight based on the weight of the polymer B, (b1) from 45% to 100% of structural units of the hydrophobic monomer, and optionally, (b2) structural units of the cycloalkyl (meth)acrylate, the ethylenically unsaturated monomer carrying at least one functional group, the polymerizable surfactant, an additional ethylenically unsaturated nonionic monomer, or mixtures thereof.

3. The aqueous dispersion of claim 1, wherein the metal salt is present in an amount of from 0.5% to 4% by weight based on the weight of the multistage polymeric particles.

4. The aqueous dispersion claim 1, wherein in formula (I), A is —CH$_2$CH$_2$—, $R_3$ is —CH=CH(CH$_3$), and X is —SO$_3$M—, wherein M is an alkali metal cation, an alkaline earth metal cation, or NH$_4^\pm$.

5. An aqueous dispersion comprising:

(i) multistage polymeric particles having a Tg in the range of from 0 to 80° C. and comprising a polymer A and a polymer B at a weight ratio of the polymer A to polymer B in the range of from 78:22 to 22:78, wherein the Tg difference between the polymer A and the polymer B is 40° C. or more, and wherein the multistage polymeric particles comprise, by weight based on the weight of the multistage polymeric particles, (a) from 10% to 40% of structural units of a cycloalkyl (meth)acrylate, (b) from 40% to 85% of structural units of a hydrophobic monomer, (c) from 0.5% to 10% of structural units of an ethylenically unsaturated monomer carrying at least one functional group selected from a carboxyl, carboxylic anhydride, sulfonic acid, amide, sulfonate, phosphoric acid, phosphonate, phosphate, or hydroxyl group, or a salt thereof, (d) structural units of a polymerizable surfactant having the structure of formula (I),

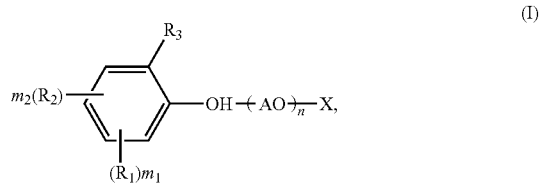

wherein $R_1$ is a phenyl group or a phenyl substituted alkyl group; $m_1$ is 1, 2, 3 or 4, $R_2$ is an alkyl group or a substituted alkyl group; $m_2$ is 0 or 1; n is an integer of from 1 to 100; A is —CH$_2$CH$_2$—, $R_3$ is hydrogen, and X is —SO$_3$M, wherein M is

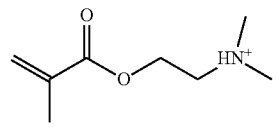

and optionally (e) structural units of an additional ethylenically nonionic monomer; and (ii) from 0 to 5%, by weight based on the weight of the multistage polymeric particles, of a metal salt.

6. The aqueous dispersion of claim 1, wherein $R_1$ is

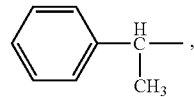

and $m_1$ is 1, 2, or 3.

7. The aqueous dispersion of claim 1, wherein n is an integer in the range of from 2 to 20.

8. The aqueous dispersion of claim 1, wherein the metal salt is selected from the group consisting of a zinc salt, a zirconium salt, an aluminum salt, or mixtures thereof.

9. The aqueous dispersion of claim 1, wherein the weight ratio of the polymer A to the polymer B in the multistage polymeric particles is in the range of from 30:70 to 70:30.

10. The aqueous dispersion of claim 1, wherein the multistage polymeric particles comprise, by weight based on the weight of the multistage polymeric particles, from 10% to 35% of structural units of the cycloalkyl(meth)acrylate.

11. The aqueous dispersion of claim 1, wherein the cycloalkyl (meth)acrylate is selected from the group consisting of cyclohexyl methacrylate, cyclohexyl acrylate, methcyclohexyl acrylate, or mixtures thereof.

12. The aqueous dispersion of claim 1, wherein the hydrophobic monomer is selected from the group consisting of butyl (meth)acrylate, iso-butyl (meth)acrylate, 2-ethylhexyl(meth)acrylate, lauryl(meth)acrylate, stearyl(meth)acrylate, styrene, or mixtures thereof.

13. The aqueous dispersion of claim 1, wherein the multistage polymeric particles comprise, by weight based on the weight of the multistage polymeric particles, from 0.1% to 3% of the polymerizable surfactant.

14. An aqueous coating composition comprising the aqueous dispersion of claim 1.

15. The aqueous dispersion of claim 1 wherein $R_3$ is hydrogen or an alkyl group having from 1 to 20 carbon atoms, and M is an aminium ion having one ethylenically unsaturated bond.

16. The aqueous dispersion of claim 1 wherein $R_3$ is $-C(R_4)=CR_5R_6$ and M independently represents hydrogen, an alkali metal cation, an alkaline earth metal cation, or $NH_4$.

17. The aqueous coating composition of claim 14 wherein $R_3$ is hydrogen or an alkyl group having from 1 to 20 carbon atoms, and M is an aminium ion having one ethylenically unsaturated bond.

18. The aqueous dispersion of claim 1 wherein the weight ratio of the polymer A to polymer B in the range of from 47.5:52.5 to 22:78.

* * * * *